United States Patent
Inoue et al.

(10) Patent No.: US 10,710,251 B2
(45) Date of Patent: Jul. 14, 2020

(54) ROBOT LINEAR OBJECT HANDLING STRUCTURE

(71) Applicant: FANUC CORPORATION, Yamanashi (JP)

(72) Inventors: Toshihiko Inoue, Yamanashi (JP); Tomoyuki Motokado, Yamanashi (JP); Masayoshi Mori, Yamanashi (JP); Wataru Amemiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 63 days.

(21) Appl. No.: 15/459,422

(22) Filed: Mar. 15, 2017

(65) Prior Publication Data

US 2017/0291313 A1 Oct. 12, 2017

(30) Foreign Application Priority Data

Apr. 7, 2016 (JP) .................................. 2016-077172

(51) Int. Cl.
*B25J 17/00* (2006.01)
*B25J 19/00* (2006.01)

(52) U.S. Cl.
CPC ........... *B25J 19/0029* (2013.01); *B25J 17/00* (2013.01)

(58) Field of Classification Search
CPC B25J 19/0025; B25J 19/0029; B25J 19/0041; H01R 13/5804; H01R 13/5816; B23K 9/323; B23K 37/02
See application file for complete search history.

(56) References Cited

U.S. PATENT DOCUMENTS

| 4,904,148 A | * | 2/1990 | Larsson | ..................... B25J 9/04 414/680 |
| 5,437,207 A | * | 8/1995 | Zimmer | ............... B23K 11/318 414/918 |

(Continued)

FOREIGN PATENT DOCUMENTS

| CN | 104511910 A | 4/2015 |
| EP | 0621112 A1 | 5/1994 |

(Continued)

OTHER PUBLICATIONS

Office Action dated Sep. 25, 2018 in corresponding Japanese Application No. 2016-077172; 6 pages including English-language translation.

(Continued)

*Primary Examiner* — Randell J Krug
(74) *Attorney, Agent, or Firm* — Maier & Maier, PLLC (57) ABSTRACT

A linear object handling structure of a robot includes a rotational drum supported above a base in a rotatable manner about a vertical axis line, a plurality of operation shafts supported by the rotational drum, and a hollow part near the vertical axis line in the rotational drum. A first linear object group including cables for driving the operation shafts has one end fixed to the base and the other end wired to the motors of the operation shafts supported by the rotational drum, and is disposed to penetrate through the hollow part. A second linear object group for a peripheral device supported by any one of the operation shafts is collectively covered by a flexible conduit pipe, disposed to penetrate through the hollow part, and detachably fixed to the base and the rotational drum.

4 Claims, 6 Drawing Sheets

(56) References Cited

U.S. PATENT DOCUMENTS

| | | | |
|---|---|---|---|
| 5,564,312 A * | 10/1996 | Brunman | B25J 19/0029 414/918 |
| 8,051,741 B2 * | 11/2011 | Inoue | B25J 19/0025 74/490.01 |
| 2004/0261563 A1 * | 12/2004 | Inoue | B25J 19/0025 74/490.03 |
| 2008/0236324 A1 * | 10/2008 | Inoue | B25J 19/0025 74/490.02 |
| 2011/0127083 A1 * | 6/2011 | Karlinger | B25J 19/0029 174/70 R |
| 2011/0252915 A1 * | 10/2011 | Nakagiri | B25J 19/0029 74/490.02 |
| 2011/0314949 A1 * | 12/2011 | Long | B25J 19/0029 74/490.04 |
| 2012/0103125 A1 * | 5/2012 | Liu | B25J 19/0025 74/490.02 |
| 2013/0047771 A1 * | 2/2013 | Liu | B25J 19/0029 74/490.02 |
| 2013/0055842 A1 * | 3/2013 | Okada | B25J 9/102 74/490.03 |
| 2014/0137685 A1 * | 5/2014 | Iwayama | B25J 18/00 74/490.02 |
| 2014/0224058 A1 | 8/2014 | Tanaka et al. | |

FOREIGN PATENT DOCUMENTS

| | | |
|---|---|---|
| EP | 0 665 089 A1 | 8/1995 |
| EP | 1491300 A1 | 12/2004 |
| EP | 2 764 958 A1 | 8/2014 |
| JP | H06-143186 A | 5/1994 |
| JP | H07-108485 A | 4/1995 |
| JP | H07-251393 A | 10/1995 |
| JP | H08-112796 A | 5/1996 |
| JP | 3483862 B | 10/2002 |
| JP | 2005-014159 A | 1/2005 |
| JP | 2014-097573 A | 5/2014 |
| JP | 2014-151413 A | 8/2014 |
| JP | 2015-104764 A | 6/2015 |

OTHER PUBLICATIONS

Search Report dated Mar. 14, 2018 in corresponding Japanese Application No. 2016-077172; 18 pages including English-language translation.

Japan Office Action dated Mar. 8, 2018 in corresponding Japan Application No. 2016-077172; 6 pgs.

Office Action dated Aug. 12, 2019 in corresponding Chinese Application No. 201710206761.6; 12 pages including English-language translation.

* cited by examiner

ROBOT LINEAR OBJECT HANDLING STRUCTURE

CROSS-REFERENCE TO RELATED APPLICATIONS

This application claims the benefit of Japanese Patent Application No. 2016-077172, the content of which is incorporated herein by reference.

TECHNICAL FIELD

The present invention relates to a robot linear object handling structure.

BACKGROUND ART

In a conventionally known structure of a rotational shaft for rotating a robot about a rotational shaft disposed in the vertical direction, a reducer having a hollow structure is fixed above a base of the rotational shaft, and drive power is supplied by a drive motor disposed at a position offset from the center of the rotational shaft in the horizontal direction, and is transferred to the reducer through spur gear pairs (for example, refer to PTL 1). With this structure, a space vertically penetrating near the center of the rotational shaft can be provided to facilitate handling of a linear object, such as a cable or a pipe, from the base of the rotational shaft to a robot body above the reducer.

CITATION LIST

Patent Literature

{PTL 1}
Japanese Unexamined Patent Application, Publication No. Hei 7-108485

SUMMARY OF INVENTION

An aspect of the present invention is a linear object handling structure of a robot including a rotational drum supported above a base in a rotatable manner about a vertical axis line, a plurality of operation shafts supported by the rotational drum, and a hollow part near the vertical axis line in the rotational drum. A first linear object group including cables for driving the operation shafts has one end fixed to the base and the other end wired to motors of the operation shafts supported by the rotational drum, and is disposed to penetrate through the hollow part. A second linear object group for a peripheral device supported by any of the operation shafts is collectively covered by a flexible conduit pipe, disposed to penetrate through the hollow part, and detachably fixed to the base and the rotational drum. The second linear object group is collectively covered in a divided manner by a plurality of flexible conduit pipes in some cases.

DESCRIPTION OF EMBODIMENTS

The following describes a linear object handling structure 1 of a robot 3 according to an embodiment of the present invention with reference to the accompanying drawings.

Figure 1:
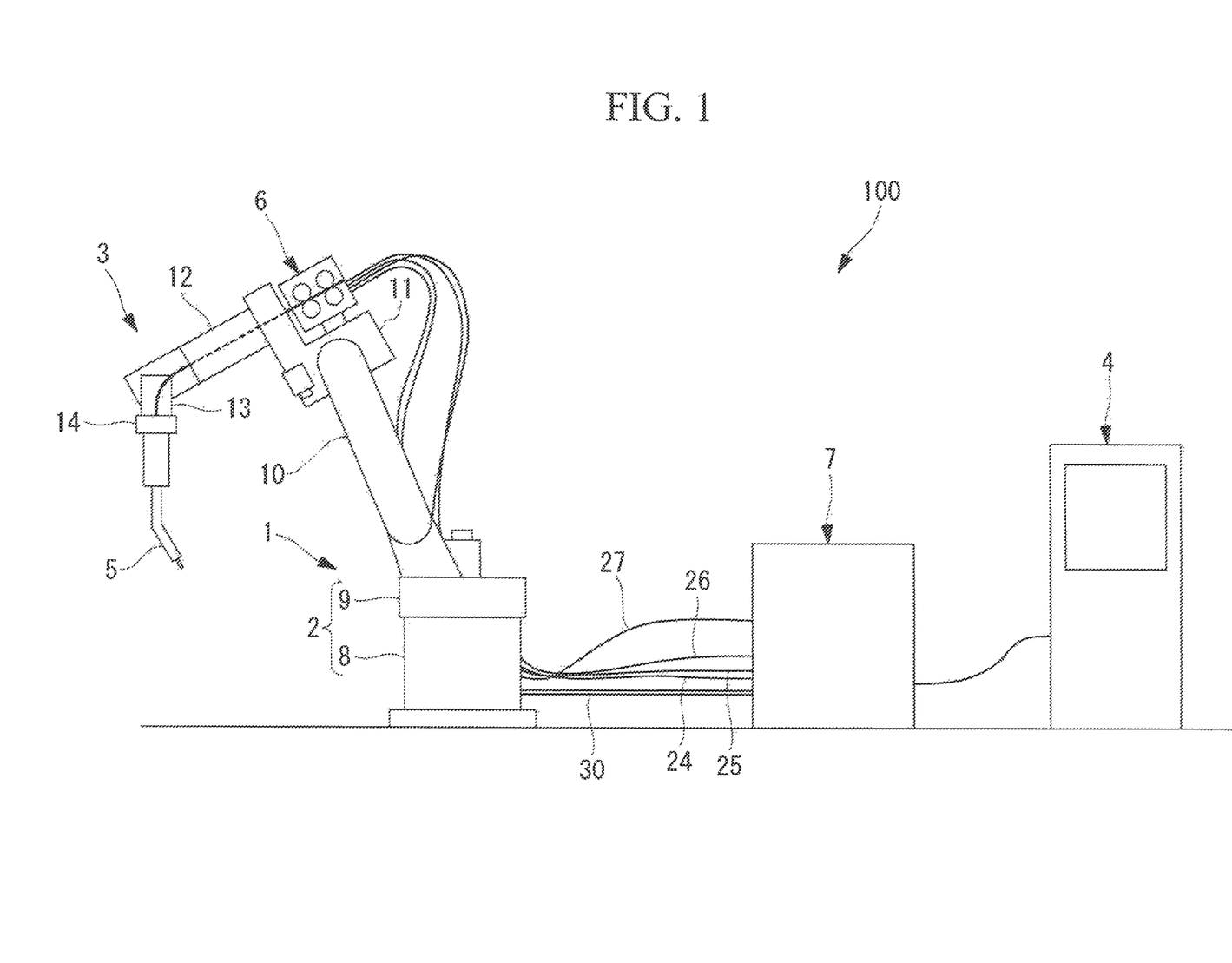
FIG. 1 is an entire configuration diagram illustrating a robot system to which a linear object handling structure of a robot according to an embodiment of the present invention is applied.

The linear object handling structure 1 of the robot 3 according to the present embodiment is applied to, for example, a robot system 100 configured to perform arc welding as illustrated in FIG. 1.

The robot system 100 includes the articulated robot 3 including a rotational shaft 2, and a robot control unit 4 configured to control the robot 3, and, for example, a welding torch (peripheral device) 5 fixed to a leading end of a wrist of the robot 3, a welding wire feeding device (peripheral device) 6 mounted on a second arm 11 to be described later, and a welding power source 7 configured to control the welding torch 5 and the welding wire feeding device 6.

The robot 3 includes, for example, the rotational shaft 2 including a rotational drum 9 supported above a base 8 fixed to the ground in a rotatable manner about the vertical axis line, a first arm (operation shaft) 10 provided to the rotational drum 9 of the rotational shaft 2 in a swingable manner about the horizontal axis line, a second arm (operation shaft) 11 provided to a leading end of the first arm 10 in a swingable manner about the horizontal axis line, a first wrist element (operation shaft) 12 provided to a leading end of the second arm 11 in a rotatable manner about a longitudinal axis of the second arm 11, a second wrist element 13 provided to a leading end of the first wrist element 12 in a rotatable manner about an axis line orthogonal to the longitudinal axis of the second arm 11, and a third wrist element 14 provided in a rotatable manner about an axis line orthogonal to the axis line of the second wrist element 13.

Motors (not illustrated) for driving the three wrist elements 12, 13, and 14 are fixed to the second arm 11 or the first wrist element 12. A motor (not illustrated) for swinging the second arm 11 relative to the first arm 10 is fixed to the second arm 11. A motor (not illustrated) for swinging the first arm 10 relative to the rotational drum 9 is fixed to the rotational drum 9. A motor (not illustrated) for rotating the rotational drum 9 relative to the base 8 is fixed to the base 8.

Figure 2:
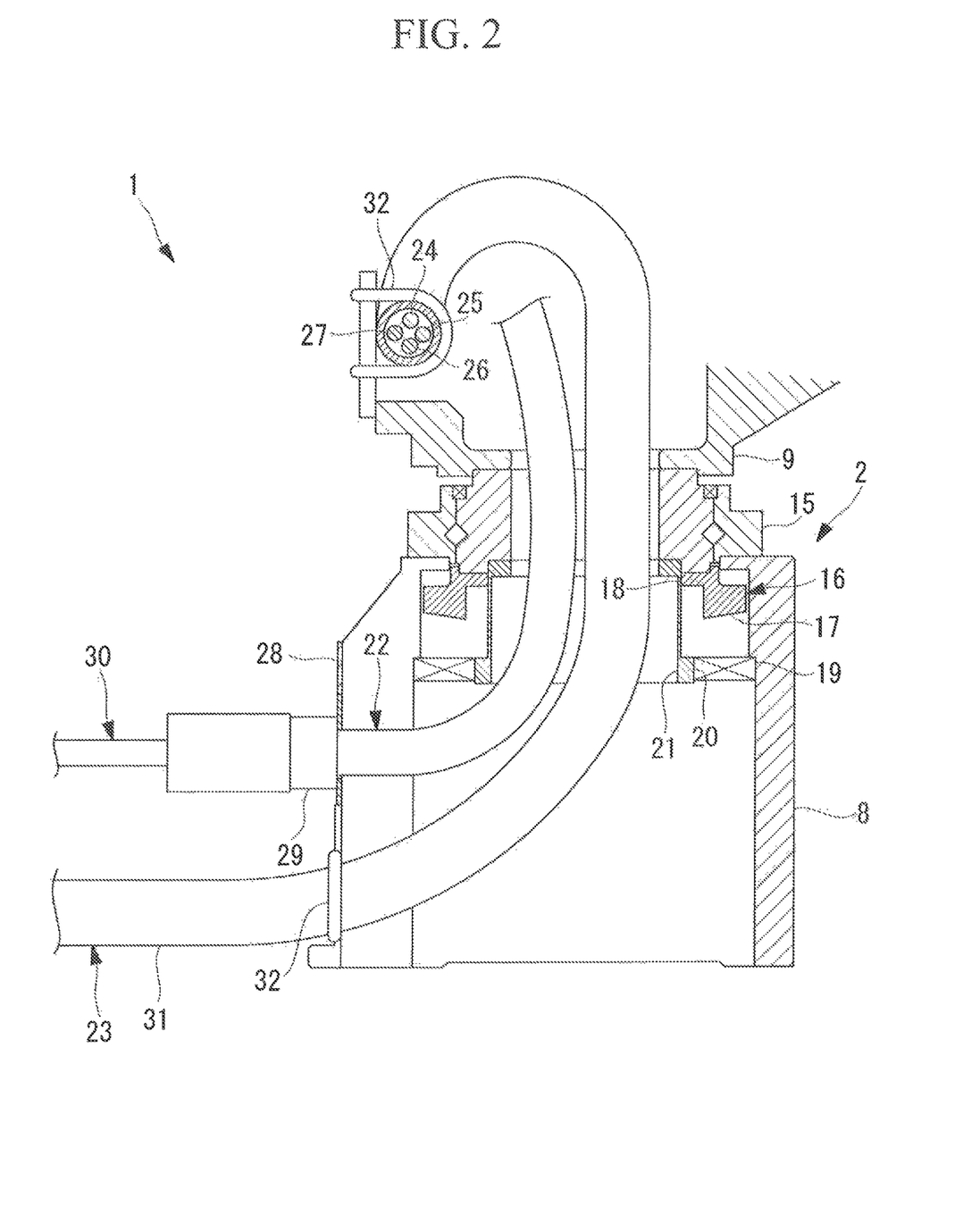
FIG. 2 is a longitudinal sectional view of a rotational shaft, illustrating the linear object handling structure of the robot illustrated in FIG. 1.

As illustrated in FIG. 2, the rotational shaft 2 includes the rotational drum 9 supported above the base 8 through a bearing 15 in a rotatable manner about the vertical axis line. A ring gear 17 included in a hypoid gear set 16 is fixed below the rotational drum 9. The ring gear 17 is provided with a through-hole 18 at a central part, and a barrel member 20 is fixed to the through-hole 18, the barrel member 20 forming an oil box together with an oil seal 19 disposed between the barrel member 20 and the inner surface of the base 8. The barrel member 20 is set to have a sufficiently small thickness in the radial direction, and includes an inner hole 21 having a sufficient diameter inside.

The hypoid gear set 16 includes a pinion gear (not illustrated) and the ring gear 17 meshing with each other in the oil box. The pinion gear is fixed to the output shaft of a motor (not illustrated) for the rotational shaft 2. The hypoid gear set 16 is sufficiently lubricated in the oil box.

The following describes the linear object handling structure 1 of the robot 3 according to the present embodiment.

In the present embodiment, linear objects include a first linear object group 22 including a cable 30 for driving each of the operation shafts 10, 11, and 12, and a second linear object group 23 for peripheral devices.

The first linear object group 22 includes a plurality of cables for supplying electrical power and control signals to the motors for driving the first arm 10, the second arm 11, and the three wrist elements 12, 13, and 14.

The second linear object group 23 includes a control cable 24 for controlling a feeding motor included in the welding wire feeding device 6, a gas hose 25, a wire conduit 26, and a power supply cable 27. A control cable for, for example, a welding sensor is included in some cases.

The first linear object group 22 includes, at one end, connectors to be connected with the motors of the operation shafts 10, 11, and 12, and includes, at the other end, a connector 29 fixed to a plate 28 blocking a through-hole on a side surface of the base 8 of the rotational shaft 2. The connector 29 fixed to the plate 28 on the side surface of the base 8 is connected with the robot controlling cable 30 extending from the robot control unit 4 through the welding power source 7.

As illustrated in FIG. 2 the first linear object group 22 extends upward from the inside of the base 8 of the rotational shaft 2 through the inner hole 21 of the barrel member 20, the inside of an inner ring of the bearing 15, and a hollow part formed around the vertical axis line of the rotational shaft 2 by the rotational drum 9, and is connected with each of the motors of the operation shafts 10, 11, and 12.

In other words, the first linear object group 22 is relayed through connector connection at the plate 28 on the side surface of the base 8 of the rotational shaft 2.

The second linear object group 23 has one end connected with the welding power source 7, and the other end connected with the welding torch 5 fixed to the third wrist element 14 of the robot 3 and with the welding wire feeding device 6 fixed to the second arm 11. In the present embodiment, the second linear object group 23 is collectively covered by resin, aramid fiber fabric, or a flexible metal conduit pipe (conduit) 31, penetrates through a through-hole provided to the plate 28 on the side surface of the base 8 of the rotational shaft 2, extends upward through the above-described hollow part, and is connected with the welding torch 5 and the welding wire feeding device 6.

In this manner, the second linear object group 23 is wired without being relayed at the plate 28 position on the side surface of the base 8. The second linear object group 23 penetrating upward and downward through the hollow part has a sufficient length necessary for rotational operation of the rotational drum 9, and is fixed near the plate 28 position on the side surface of the base 8 and on the inner surface of the rotational drum 9 by a fixing member 32 such as a U bolt at intermediate positions in its longitudinal direction.

The following describes effects of the linear object handling structure 1 of the robot 3 according to the present embodiment configured in this manner.

Figure 7:
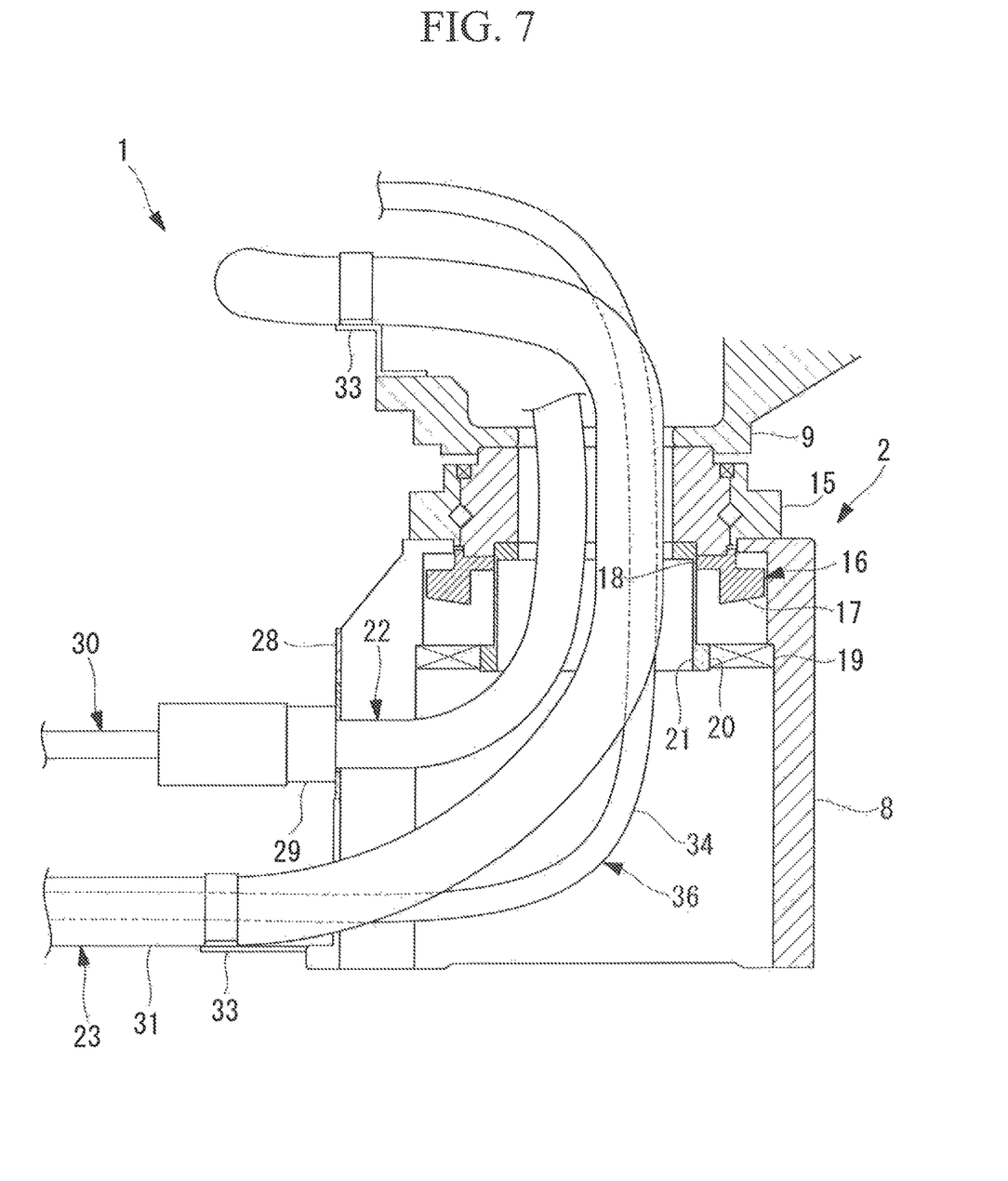
FIG. 7 is a longitudinal sectional view of the rotational shaft, illustrating a modification of the linear object handling structure of the robot illustrated in FIG. 1.

According to the linear object handling structure 1 of the robot 3 according to the present embodiment, the second linear object group 23 including, for example, the cables 24, 25, 26, 27 for peripheral devices is collectively covered by the flexible conduit pipe 31 while being separated from the first linear object group 22 including, for example, the cable 30 for driving the robot 3, which advantageously allows installation and replacement work of the second linear object group 23 to be easily performed by a user. For example, as illustrated in FIG. 7, a linear object 36 for another peripheral device, such as the control cable for a welding sensor is installed through another flexible conduit pipe 34 along the conduit pipe 31 in some cases. In such a case, too, the above-described effect is achieved.

Figure 3:
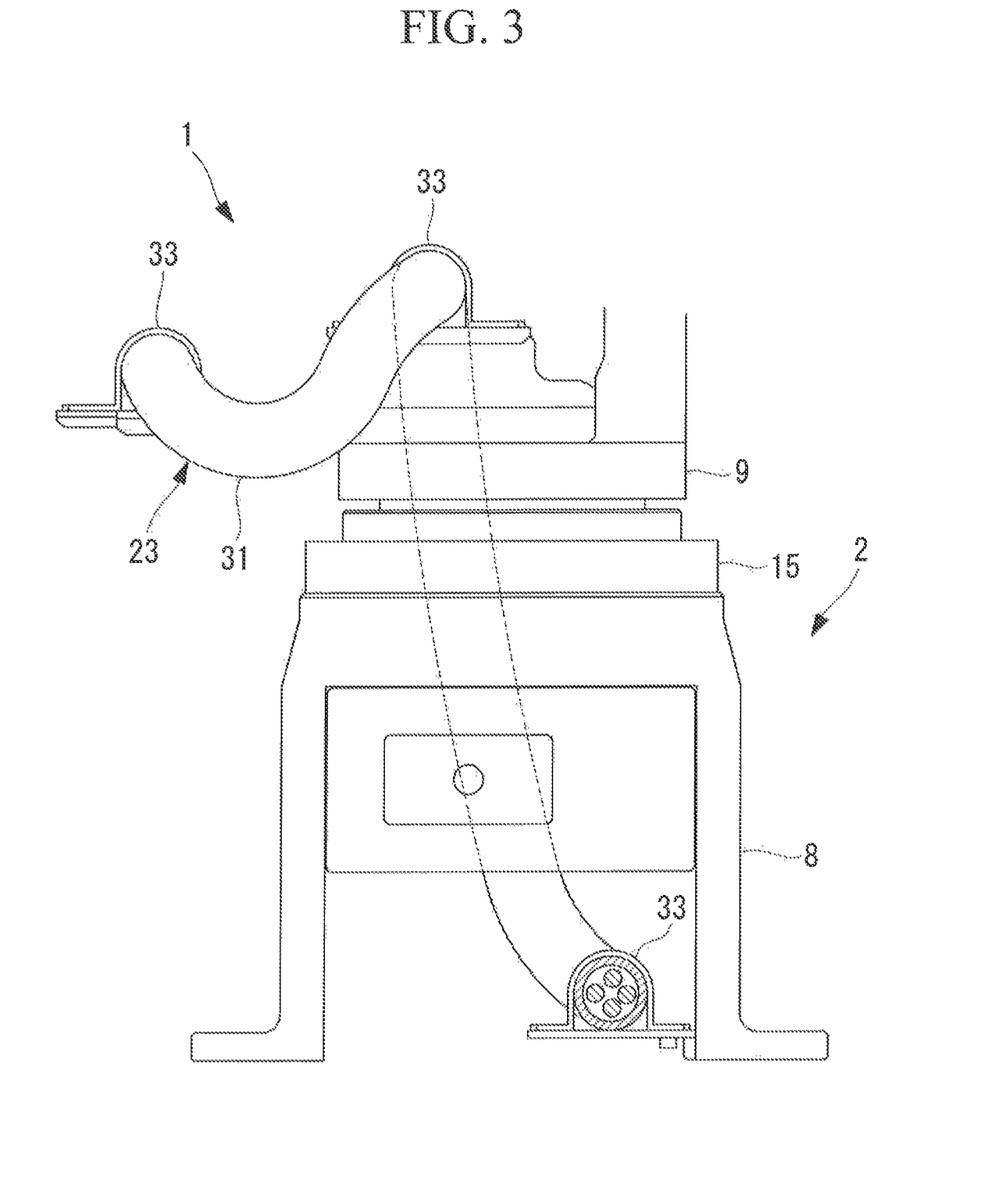
FIG. 3 is a side view illustrating an exemplary method of relaying a flexible conduit pipe in the rotational shaft illustrated in FIG. 2.
Figure 4:
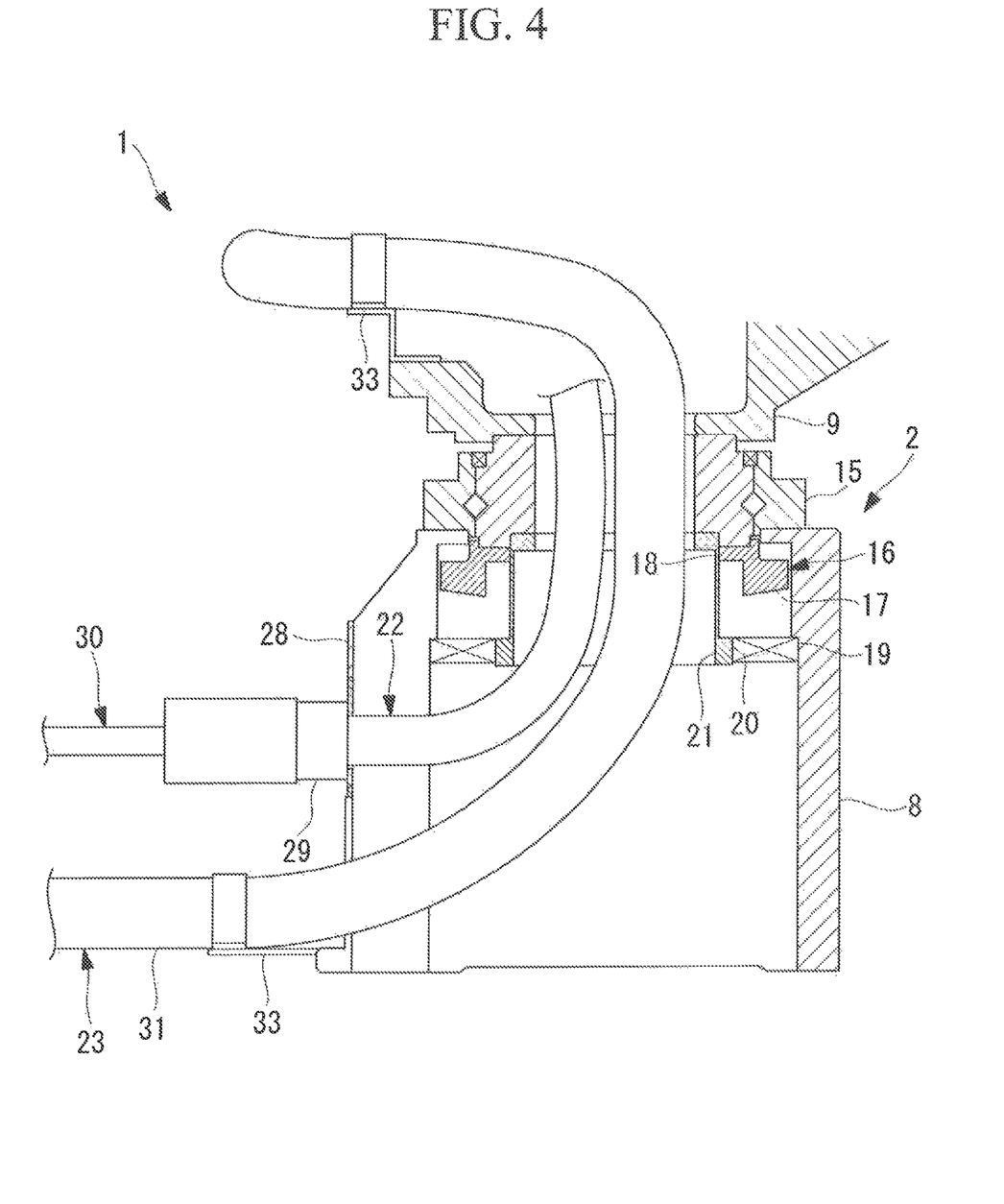
FIG. 4 is a longitudinal sectional view of the rotational shaft illustrated in FIG. 3.

Specifically, the second linear object group 23 can be installed by routing the second linear object group 23, which is collectively covered by the conduit pipe 31, to the base 8 of the rotational shaft 2 through the rotational drum 9, the inside of the inner ring of the bearing 15, and the inner hole 21 of the barrel member 20, pulling the second linear object group 23 externally through the through-hole on the side surface of the base 8, and then fixing the second linear object group 23 near the plate 28 position on the side surface of the base 8 and on the inner surface of the rotational drum 9 through the fixing member 32 such as a U bolt at intermediate positions in a length direction of the conduit pipe 31 or through a bracket (fixing member) 33 in a movable manner in an axial direction of the conduit pipe 31 as illustrated in FIGS. 3 and 4. The second linear object group 23 can be replaced by removing the fixing member 32 and pulling out the conduit pipe 31. As illustrated in FIG. 7, when a plurality of the conduit pipes 31 and 34 are provided, these pipes are collectively fixed through the fixing member 32 or in a movable manner in the axial direction of the conduit pipes 31 and 34, which allows removal and replacement thereof.

Figure 5:
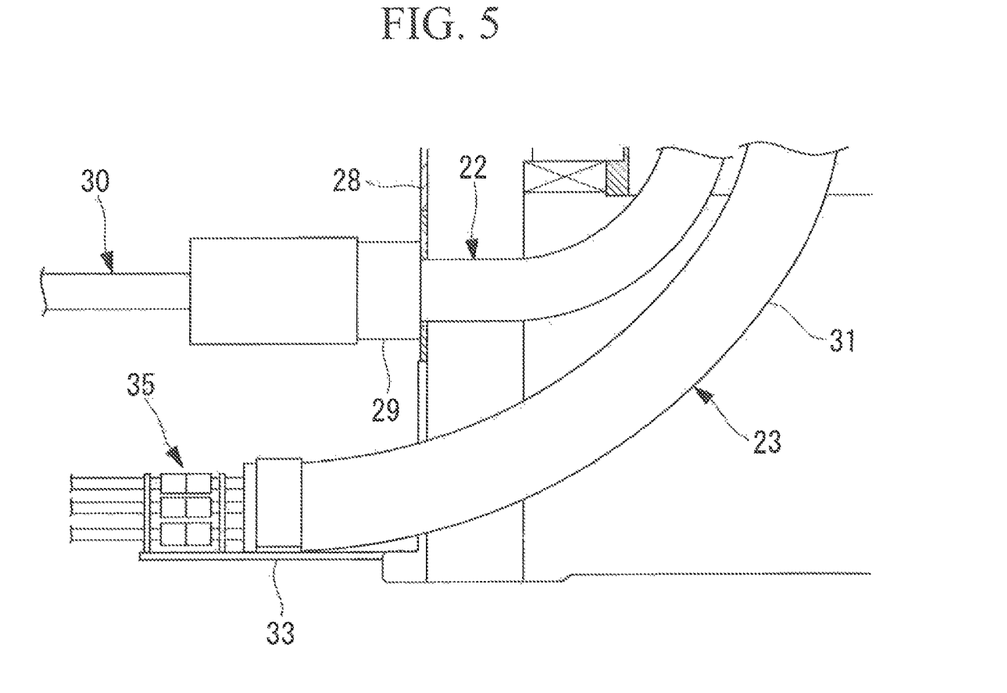
FIG. 5 is a longitudinal sectional view of the rotational shaft, illustrating a first modification of the method of relaying the flexible conduit pipe in the linear object handling structure of the robot illustrated in FIG. 1.

In the linear object handling structure 1 of the robot 3 according to the present embodiment, as a method of relaying the flexible conduit pipe 31, the conduit pipe 31 is disposed to penetrate through the through-hole provided to the plate 28. However, as illustrated in FIG. 5, the second linear object group 23 may be relayed at a position outside the plate 28 by a relaying connector unit 35 fixed to the bracket 33, and may be disposed to penetrate through the through-hole provided to the plate 28 while being collectively covered by the conduit pipe 31 fixed to the bracket 33.

Figure 6:
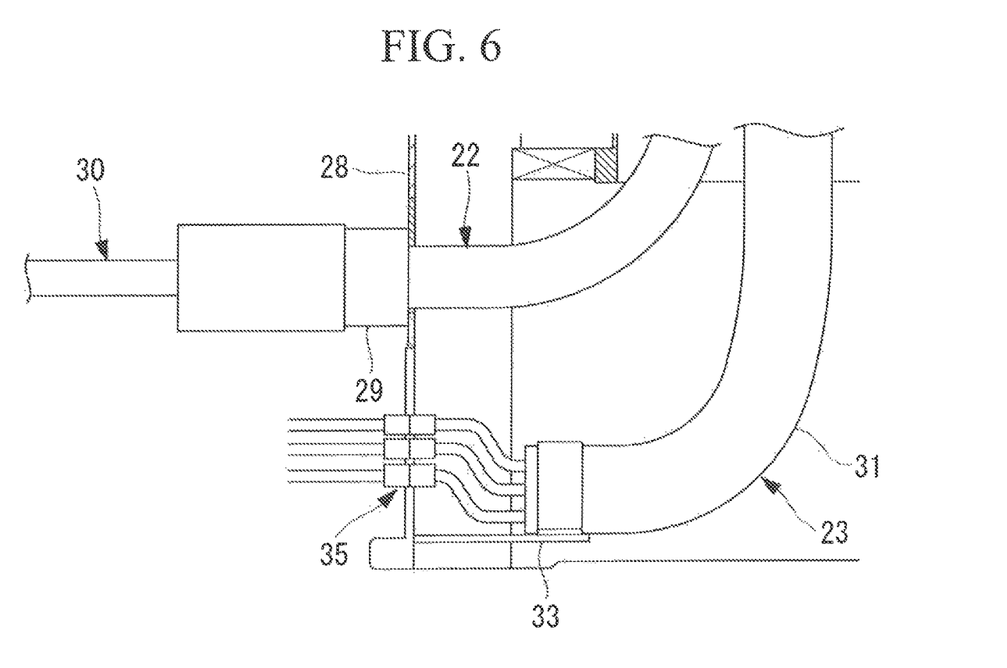
FIG. 6 is a longitudinal sectional view of the rotational shaft, illustrating a second modification of the method of relaying the flexible conduit pipe in the linear object handling structure of the robot illustrated in FIG. 1.

Alternatively, as illustrated in FIG. 6, the second linear object group 23 may be relayed by the relaying connector unit 35 fixed to the plate 28 on the side surface of the base 8 and may be collectively covered by the conduit pipe 31 fixed to the bracket 33 in the hollow part.

In installation and replacement work, the user can only handle the second linear object group 23 collectively covered by the conduit pipe 31, and thus does not need to remove the first linear object group 22 including the cable 30 necessary for driving the robot 3, which is advantageous.

Since the hypoid gear set 16 serves as a reducer, a relatively large space can be obtained inside the ring gear 17 fixed to the output shaft of the rotational shaft 2. As a result, the hollow part for routing the linear object can have a large inner diameter, which allows easy installation and replacement of the first and second linear object groups 22 and 23.

Since the cables 24, 25, 26, 27, and 30 of the first and second groups each have a sufficient length necessary for rotational operation of the rotational drum 9, displacement due to bending and twisting occurs in the hollow part along with rotational operation of the rotational drum 9. However, the large inner diameter of the hollow part leads to a low amount of friction of the linear objects 22 and 23 with each other and of the linear objects 22 and 23 with a mechanism component such as the rotational drum 9, thereby maintaining the cables in a healthy state for a long time.

In the present embodiment, the second linear object group 23 is wired without relaying through a connector at the plate 28 of the base 8 of the rotational shaft 2, thereby achieving reduction in cost with a reduced number of components.

It is preferable that the plate 28 for fixation to the base 8 is fixed to the connector 29 at one end of the first linear object group 22 in advance and has a dimension with which the plate 28 can pass through the hollow part including the rotational drum 9, the bearing 15, and the barrel member 20. With this configuration, attachment work can be completed by placing the plate 28, which is fixed to the one end of the first linear object group 22, from above to the base 8 of the rotational shaft 2 through the hollow part and then fixing the plate 28 to the base 8. This facilitates assembly work.

The fixing member 32 may be fixed in advance at an intermediate position of the flexible conduit pipe 31 collectively covering the second linear object group 23. With this configuration, attachment work can be completed by placing the second linear object group 23 from above to the base 8 of the rotational shaft 2 through the hollow part, pulling out the second linear object group 23 through the side surface of the base 8, and then fixing the fixing member 32 to the base 8 and the rotational drum 9. The fixing member 32, which is fixed at a position to provide a sufficient space necessary for operation in advance, facilitates attachment work. This allows the user to easily perform replacement work of the second linear object group 23.

From the above-described embodiment, the following invention is derived.

An aspect of the present invention is a linear object handling structure of a robot including a rotational drum supported above a base in a rotatable manner about a vertical axis line, a plurality of operation shafts supported by the rotational drum, and a hollow part near the vertical axis line in the rotational drum. A first linear object group including cables for driving the operation shafts has one end fixed to the base and the other end wired to motors of the operation shafts supported by the rotational drum, and is disposed to penetrate through the hollow part. A second linear object group for a peripheral device supported by any of the operation shafts is collectively covered by a flexible conduit pipe, disposed to penetrate through the hollow part, and detachably fixed to the base and the rotational drum. The second linear object group is collectively covered in a divided manner by a plurality of flexible conduit pipes in some cases.

According to the present aspect, a user does not need to remove the first linear object group including the cables for driving the operation shafts of the robot, and can attach and detach, separately from the first linear object group, the second linear object group for the peripheral device fixed to any one of the operation shafts, because the second linear object group is collectively covered by the flexible conduit pipe. Accordingly, only the second linear object group can be easily replaced without removing the first linear object group, thereby achieving improved handling operability and maintainability of the second linear object group. The above-described effect can be obtained when the second linear object group is collectively covered in a divided manner by the flexible conduit pipes.

In the above-described aspect, the first linear object group may be fixed to the base by a connector provided at one end, and the second linear object group may be detachably fixed to the base at an intermediate position in a length direction of the conduit pipe.

With this configuration, the robot can be carried in an improved manner by relaying, through the connector at the base, the first linear object group including the cables for driving the operation shafts of the robot. The second linear object group, which is installed by a user, does not need to be relayed at the base, which can lead to reduction in the number of components. Alternatively, the second linear object group may be relayed at the base.

In the above-described aspect, the first linear object group and the second linear object group may be fixed to different fixing members for fixation to the base, and may be disposed to penetrate through the hollow part from above together with the fixing member and then fixed to the base below the rotational drum by the fixing members.

With this configuration, positions at which the linear objects are to be attached to the base can be determined in advance, and the linear objects can be each fixed between the base and the rotational drum at a position to provide a minimum length required to absorb twisting and bending of the linear objects due to rotation of the rotational drum.

REFERENCE SIGNS LIST

1 linear object handling structure
3 robot
5 welding torch (peripheral device)
6 welding wire feeding device (peripheral device)
8 base
9 rotational drum
10 first arm (operation shaft)
11 second arm (operation shaft)
12 first wrist element (operation shaft)
22 first linear object group
23 second linear object group
29 connector
30 cable
31, 34 conduit pipe
32 fixing member
33 bracket (fixing member)

The invention claimed is:

1. A linear object handling structure of a robot, comprising:
a rotational drum supported above a base in a rotatable manner about a vertical axis line, and a plurality of operation shafts supported by the rotational drum, the base having a plate disposed on one side thereof, wherein:
a ring gear included in a hypoid gear set is fixed below the rotational drum;
a first linear object group including cables for driving the operation shafts and a second linear object group for a peripheral device supported by any one of the operation shafts are wired so as to be separately movable from each other inside a space obtained inside the ring gear, the second linear object group being collectively covered by a flexible conduit pipe, and,
the second linear object group penetrates through a second linear object group through-hole provided on the base to extend out of the base, wherein the first linear object group further comprises a connector fixed to the plate and has a relay connection via the connector, and wherein the second linear object group does not include a connector fixed to the plate and does not have a relay connection inside the space and the base.

2. The linear object handling structure according to claim 1, wherein the second linear object group is detachably fixed to the base at an intermediate position in a length direction of the conduit pipe.

3. The linear object handling structure according to claim 1, wherein the first linear object group and the second linear object group are fixed to different fixing members for fixation to the base, and are disposed to penetrate through the space from above together with the fixing members and then fixed to the base below the rotational drum by the fixing members.

4. The linear object handling structure according to claim 1, further comprising a first linear object group through-hole provided on the base through which the first linear object group extends, the first linear object group through-hole separate from the second linear object group through-hole.

* * * * *